June 24, 1930. S. NAKAGAWA 1,766,797
COOKING UTENSIL
Filed Nov. 24, 1928
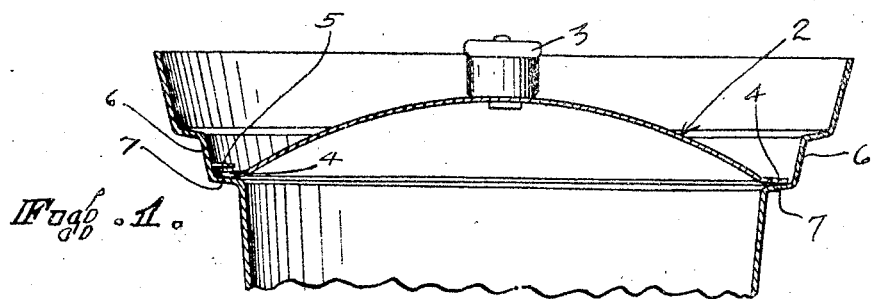
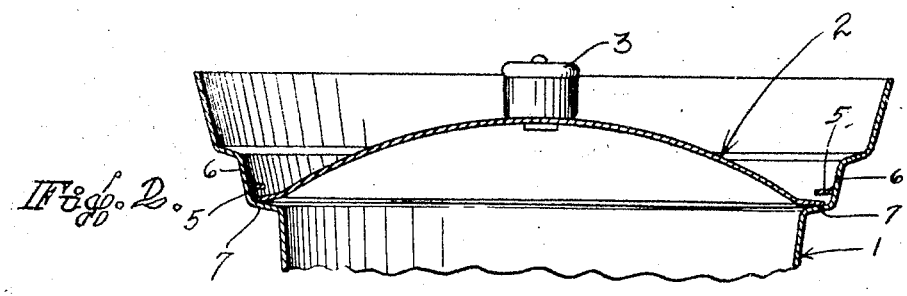
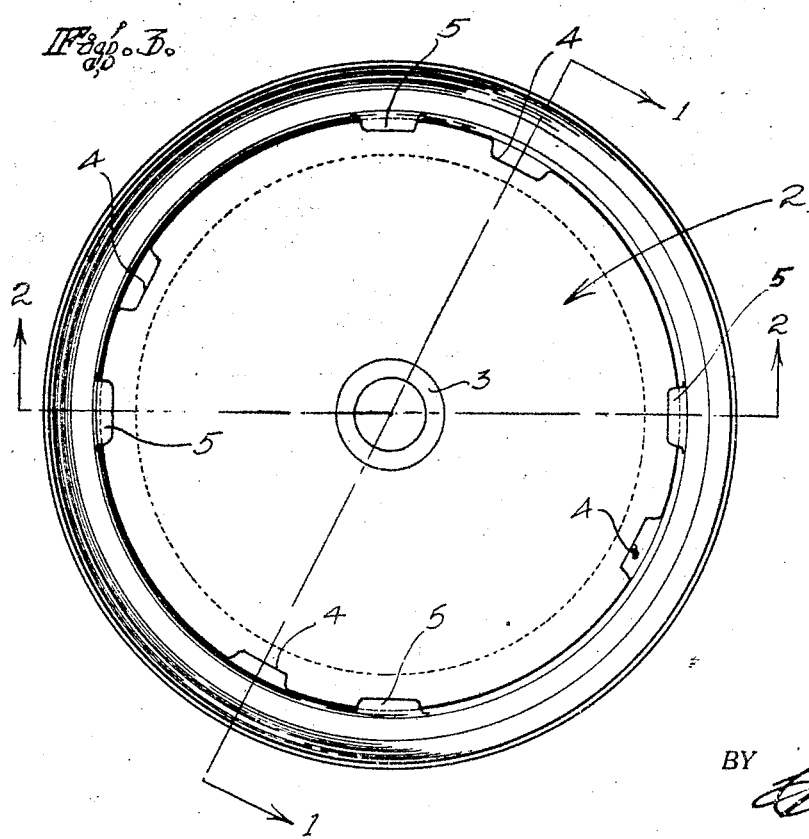
INVENTOR.
S. NAKAGAWA.
BY
ATTORNEY Patented June 24, 1930

1,766,797

UNITED STATES PATENT OFFICE

SHOICHI NAKAGAWA, OF SAN JOSE, CALIFORNIA

COOKING UTENSIL

Application filed November 24, 1928. Serial No. 321,578.

This invention relates to cooking utensils and more specifically to vessels with covers that are used for boiling purposes.

An object of this invention is to eliminate "boiling over" of covered vessels.

Another object is to prevent steam shooting sideways from under the cover of the vessel while boiling is taking place.

A distinct advantage of my invention lies in the fact that although steam may escape and boiling water is not confined under the cover, yet the water is automatically returned and will not boil over the side of the vessel, due to the improved vessel and cover that I have provided.

These objects and advantages together with any subsequent ones that may be developed in the specifications, constitute the premises upon which my invention is predicated.

In the drawings:

Fig. 1 is a center line vertical section.

Fig. 2 is a center line vertical section at right angles to Fig. 1.

Fig. 3 is a top plan view of my utensil with the cover in place.

In Fig. 1 the vessel portion is generally designated by the numeral 1 and the top in its entirety by the numeral 2. The top is equipped with the ordinary handle 3.

As shown in Figs. 1 and 2, the top is crowned and slopes downward at all points to the extreme periphery. The purpose of this is to drain all water to the edge. Around the periphery of the cover there are provided notches 4. These notches are adapted to coincide and pass tongues 5 which are suitably attached to the wall 6 of the vessel 1. The shoulder 7 which joins the main walls of the vessel 1 to the sloping wall 6 is also given a slight slope downward but is left level sufficiently far to maintain a contact to close the openings 4 in the cover. The top of the vessel wall is curved outwardly and upwardly from the wall 6 in the manner shown in Figs. 1 and 2. The purpose of these upwardly and outwardly sloping walls is to prevent side escape of steam and also to return any water that might well up over the cover.

The tongues 5 and notches 4 provide means for holding the cover against rising or tipping from steam pressure or boiling water beneath it.

Having set forth and described one embodiment of my idea, I reserve the right to such modifications and refinements as come within the scope and spirit of the specification and appended claim.

I claim:

A cooking utensil comprising a vessel having the top portion of its walls flare upwardly and inwardly, and provided with a shoulder near the top of the wall, a plurality of tongues extending inwardly from the walls thereof, spaced above said shoulder, a domed cover provided with a plurality of notches on its periphery adapted to pass said tongues, said cover being formed to drain water over the periphery at all points, and a handle suitable for turning and lifting said cover, said tongues being spaced above the periphery of the cover to allow a limited tilting of the cover without the removal of the same.

SHOICHI NAKAGAWA.